United States Patent [19]

Negishi et al.

[11] Patent Number: 4,870,434
[45] Date of Patent: Sep. 26, 1989

[54] PRINTER FOR CONTINUOUS FORM WITH JUSTIFICATION CONTROL

[75] Inventors: Kiyoshi Negishi, Tsurugashima; Ikuo Negoro, Sakado; Masahiro Kita, Tokyo, all of Japan

[73] Assignee: Asahi Kogaku Kogyo K.K., Tokyo, Japan

[21] Appl. No.: 195,661

[22] Filed: May 18, 1988

[30] Foreign Application Priority Data

May 19, 1987 [JP] Japan .................. 62-121690

[51] Int. Cl.$^4$ ............................. G01D 15/00
[52] U.S. Cl. ................................ 346/160; 400/3
[58] Field of Search ............ 346/160, 107 R, 108; 358/300, 302; 355/8; 400/119, 15, 1-3; 364/518, 519, 523

[56] References Cited

U.S. PATENT DOCUMENTS 4,737,922  4/1988  Ogasawara et al. ............. 400/3
4,761,662  8/1988  Yoshimotu et al. ............ 346/160

OTHER PUBLICATIONS

Ser. No. 177,352, Kita et al.
Ser. Nos. 195,298, Negoro et al., 195, 653, Negoro et al., 218,866, Negoro et al.

Primary Examiner—Arthur G. Evans
Attorney, Agent, or Firm—Sandler & Greenblum

[57] ABSTRACT

A justification system is provided for use in an electrophotographic printer. The justification system comprises a detector which detects the passage of individual segments of a continuous form which are being fed at a predetermined rate. A counter counts the number of main scannings of a laser beam carrying printing information over the surface of a photoconductive drum. A read control is connected to the detector and the counter and controls reading of main information stored by monitoring outputs from the detector and the counter so that printing of each segment always occurs at a predetermined position, synchronously with passage of the segments.

5 Claims, 5 Drawing Sheets

PRINTER FOR CONTINUOUS FORM WITH JUSTIFICATION CONTROL

BACKGROUND OF THE INVENTION

This invention relates to a printer which prints information on a continuous form by transferring toner images thereonto, and more particularly to a justification system for controlling printing in accordance with the rules on the continuous form.

Conventionally, there is known an image recording device utilizing a so-called electrophotographic system in which a surface of a photoconductive drum is exposed to light to form a latent image on the drum surface, toner is then applied to the latent image to develop the image, and the developed image is transferred onto a recording sheet material and is fixed by a fixing unit. Such an image recording device is chiefly employed in a copying machine. In recent years, however, image recording devices have been utilized in printers and the like for printing out output from a computer.

In a copying machine, in general, cut sheets are used as the recording sheet material, and a heat-roll fixing system is utilized wherein the toner is fixed by heat as well as pressure. In addition, a pressure fixing system has recently been developed, which is low in electric power consumption and which does not require an undue amount of time for preheating the heat rolls.

In the printer, however, it is desired to use, as the recording material, a continuous recording which is form identical with that used in a conventional line-printer; the continuous recording form identical to the conventional one is a folded continuous recording form (hereinafter referred to simply as "continuous form"), called a fan-folded form, which has formed therein sprocket holes. Perforations are provided between each of the folded sections to enable sheet sections to easily be severed from each other. Horizontal rules are marked at predetermined intervals in a longitudinal direction between the perforations, with a predetermined positional relationship respective to the sprocket holes.

In the above printer, a continuous form having carried thereon unfixed toner image is clamped and passed between a pair of rotating fixing rolls so that the toner image is fixed onto the continuous form. The continuous form is driven to travel by, for instance, rotation of the fixing rolls.

In the meantime, the printer employing the fan-folded form defines a non-printing area around the perforations because the form is cut into pieces of paper at the perforations after printing.

In the printer described above, however, expansion or contraction of the continuous form due to humidity, variation in the diameter of the fixing rolls, change in the thickness of the continuous form at the fixing rolls, and so on, cause printable segments of the continuous form to be out of phase with the associated area of the circumferential peripheral surface of the photoconductive drum, relative to rules.

Further, motors utilized for scanning the photoconductive drum and the exposure system are varied in their rpm (revolutions per minute) due to the variation in supply voltage and their age. Thus, even if each printing segment of the continuous form is fed at a constant rate, the associated area of the photoconductive drum is shifted out of position and thereby the printing position is slipped away from the rules, resulting in a poor impression.

Moreover, the continuation of printing accumulates such errors, making the rules meaningless. In the worst case, the printing occurs at non-printing areas around the perforations.

SUMMARY OF THE INVENTION

It is therefore an object of the invention to provide a justification system for use in an electrophotographic printer, employing a continuous form.

For the above purpose, according to the invention, there is provided a justification system for use in an electrophotographic printer in which the surface of a photoconductive drum is main scanned in a direction of the axis of the drum, and in which electrophotographic printing occurs on a continuous form which is fed at a predetermined rate by a feed mechanism and provided with a plurality of print segments, said justification system comprising:

detector means for detecting passage of end of each segment of said continuous form;

counter means for counting the number of said main scannings on said photoconductive drum, starting with the passage of said end of each said segment;

storage means for storing printing information; and control means for controlling the reading of the printing information from said storage means on the basis of the number of said main scannings as counted by said counter means, and passage of the end of each said segment as detected by said detector means, in such a manner that the printing on said continuous form always occurs at a preselected position with respect to each said segment.

DESCRIPTION OF THE ACCOMPANYING DRAWINGS

DESCRIPTION OF THE EMBODIMENTS

Figure 1:
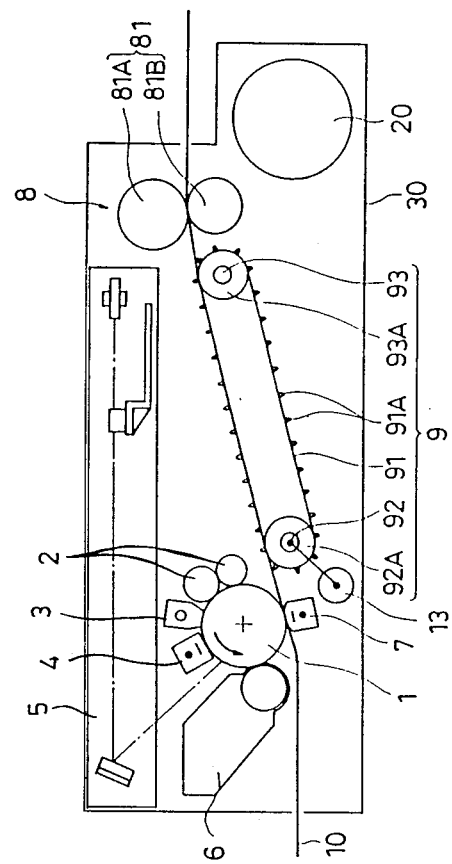
FIG. 1 is a side view of a printer with a justification system embodying the invention.
Figure 2:
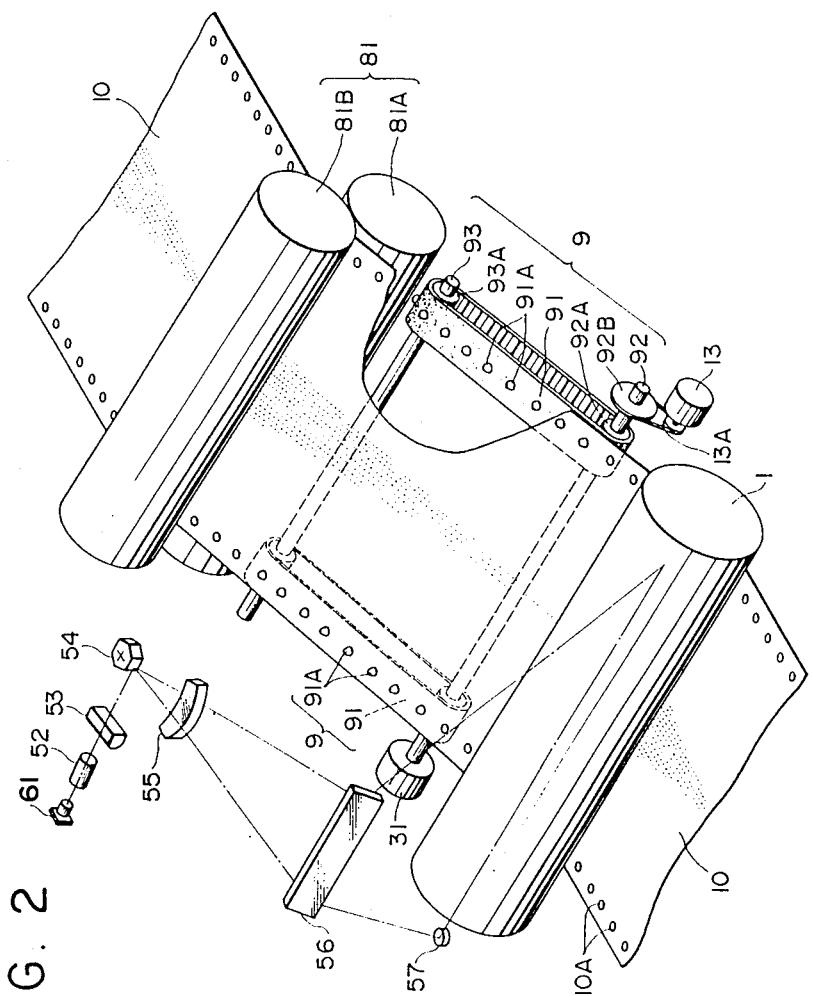
FIG. 2 is a diagrammatic perspective view showing principal parts of the printer.

Referring to FIGS. 1 and 2, there is illustrated a laser beam printer, in which a fan-folded form 10 is used as a continuous recording form, and in which a justification system embodying the invention is incorporated. The laser beam printer is designed to print out information fed from a computer or the like, not shown, onto the fan-folded form 10 by means of an electrophotographic system.

The laser beam printer comprises a photoconductive drum 1. Arranged about the photoconductive drum 1 in order in the rotational direction thereof indicated by the arrow in FIG. 1, are a toner-cleaning station 2, a decharging station 3, a charging station 4, an optical scanning system 5 for directing a laser beam modulated on the basis of inputted information to the photoconductive drum 1, a developing station 6, and a transferring station 7. A fixing station 8 is arranged downstream of the photoconductive drum 1 with reference to the traveling direction in which the fan-folded form 10 travels along a predetermined path. A direction-regulating feed mechanism 9 is arranged in the predetermined path and at a location between the photoconductive drum 1 and the fixing station 8.

The optical scanning system 5 comprises a semiconductor laser 61, a collimator lens 52, a beam shaper 53, a polygonal mirror 54, and F lens 55 and a reflecting mirror 56. The beam emission of the semiconductor laser 61 is regulated by a laser beam modulating circuit 41. A modulating signal Sv is fed into the beam modulating circuit 41 from an image information generating circuit 40, into which a signal Sv is fed from a host computer, not shown.

The arrangement is such that the laser beam from the optical scanning system 5 scans the charged surface of the drum 1 along an axis thereof to carry out a main scanning, and the drum 1 is rotated to carry out an auxiliary scanning, to thereby form a latent image on the charged drum surface. Toner is then applied at the developing station 6 to the latent image to develop the same. Subsequently, the developed toner image is transferred at the transferring station 7 onto the fan-folded form 10 driven to travel by the mechanism of the fixing station 8 at a velocity identical with the peripheral speed of the photoconductive drum 1. The transferred toner image on the fan-folded form 10 is fixed at the fixing station 8. The fan-folded form 10 carrying the fixed image thereon is discharged out of the printer.

At the fixing station 8, a fixing roll pair 81 is arranged which is composed of a pair of upper and lower pressure rolls 81A and 81B having their respective axes extending perpendicularly to the traveling direction of the fan-folded form 10. A gap defined between outer peripheral surfaces of the respective upper and lower pressure rolls 81A and 81B of the fixing roll pair 81 is set so that when the fan-folded form 10 is clamped between both of the pressure rolls 81A and 81B, the fan-folded form 10 is pressurized with a predetermined pressure.

The upper pressure roll 81B is drivingly connected to a drive motor 20 through a chain (not shown). The upper pressure roll 81B is rotatably driven by the drive motor 20 to clamp the fan-folded form 10 having carried thereon an unfixed image, between the upper and lower pressure rolls 81B and 81A. The upper and lower pressure rolls 81B and 81A cooperate with each other to pressurize the fan-folded form 10 to squeeze the unfixed image thereon, thereby fixing the image onto the fan-folded form 10. This is called a pressure-fixing system. The upper and lower pressure rolls 81B and 81A also cooperate with each other to drive the fan-folded form 10 to travel along the predetermined path, to discharge the fan-folded form 10, carrying thereon the fixed image, out of the printer.

The peripheral speed of the photoconductive drum 1 is brought completely into concidence with that of the pressure roll pair 81. That is, the fan-folded form 10 is driven to travel at a transport velocity corresponding to the peripheral speed of the pressure roll pair 81.

Meanwhile, a heat roll fixing system may, of course be adopted instead of the pressure fixing system in this embodiment.

The direction-regulating feed mechanism 9 comprises a pair of endless tension belts 91 and 91 which are arranged, respectively, below the opposite side edge portions of the fan-folded form 10, which travels from the transferring station 7 toward the fixing station 8 along the predetermined path. The tension belts 91 and 91 extend parallel to the traveling direction.

Each of the tension belts 91 comprise a so-called synchronous belt provided on an inner peripheral surface with a plurality of teeth so as to mesh with pulleys 92A and 93A. Each of the tension belts 91 is further provided on an outer peripheral surface with a plurality of projections 91A which are arranged in a single row along the entire periphery of the tension belt 91. The projections 91A on each tension belt 91 are spaced from each other at intervals of ½ inch equal to that of the sprocket holes 10A formed along a corresponding one of the opposite side edges of the fan-folded form 10, so that the projections 91A are engageable, respectively, with the sprocket holes 10A as shown in FIG. 2.

In the meantime, the projections 91A are spindle shaped, facilitating engagement with the sprocket holes 10A.

The tension belt 91 extends between two parallel pulleys 92A and 93A mounted on shafts 92 and 93, perpendicular to the feed direction of the fan-folded form 10. The upper path of the belt 91 coincides with the path of the fan-folded paper 10.

A power clutch 31 is coupled to one end of the shaft 92, causing the shaft 92 to rotate with a predetermined torque. A rotary encoder 13, serving as a detector for detecting the passage of the end of each predetermined segment of the fan-folded form 10, is coupled to the opposite end of the shaft 92 through a pulley 92B and a belt 13A. The rotary encoder 13 is adapted to produce a signal in synchronism with the projections 91A on the tension belt 91, generating one pulse each time the projection 91A passes by a certain point in its cyclical path.

Since the projections 91A on the tension belt 91 mesh with the sprocket holes 10A of the fan-folded form 10, the output signal of the rotary encoder 13 corresponds to the pitch of the sprocket holes 10A in the fan-folded form 10. In view of the predetermined relationship of the pitch of the sprocket holes 10A of the fan-folded form 10 with the rules provided thereon (in this embodiment, two pitches of the sprocket holes 10A of the fan-folded form 10 are assigned one inch, for which there are four rules so as to divide the one inch segment into three equal parts), and the output signal of the rotary encoder 13 is thus rendered to be in synchronism with the rules on the fan-folded form 10. The output signal of the rotary encoder 13 will be referred to simply as PFS (Paper Feed Signal) hereinunder.

The pulley 92A is coupled to the shaft 91 through a one-way clutch, not shown, which allows the pulley 92A to rotate with the shaft 92 in the feed direction, of the fan-folded form 10 but prevents shaft 92 from rotating in the reverse directio,n with only the pulley 92A being idled.

The pulley 93A is rotatably mounted on the shaft 93.

There is provided a BD (Beam Detecting) sensor 57 which produces a horizontal synchronous signal when the laser beam main-scans the photoconductive drum 1, and which may comprise a photodetector disposed in the path of the main scanning at a position which is a predetermined distance away from the end of the photoconductive drum 1 in its axial direction. A pulse start-write control signal, i.e. a horizontal synchronous signal (referred to as simply "Hsync" hereinafter) is generated after the BD sensor 57 receives the laser beam. The number of main scannings may be obtained by counting the signal pulses.

Figure 3:
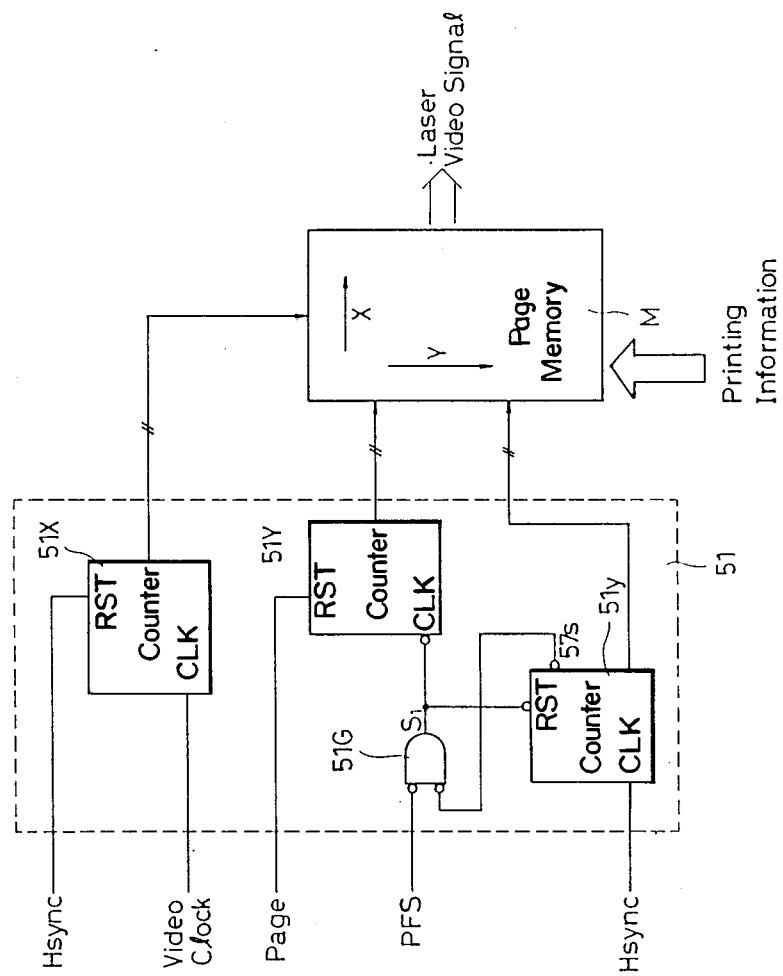
FIG. 3 is a functional block diagram of the justification system.

Referring now to FIG. 3, there is shown a block diagram of a justification system to correct the position of printing on the continuous form.

The justification system comprises a page memory M serving as means for storing printing information to be printed by the laser-beam printer, and a read control 51 (the portion enclosed by a dotted block as shown in FIG. 3) serving as means for controlling reading from the page memory M.

The page memory M stores a page of text information, and is addressed by the read control 61 to output the text information as a laser video signal to a laser modulator on a single main-scanning basis. When the current page has been read out, the contents of the page memory M are referred to the next page for the next reading.

The semi-conductor laser 61 is switched by a laser beam modulator, not shown, to produce a modulated laser beam carrying printing information.

Using, for example, 120 DPI (dots per inch) as the number of main-scannings of the laser beam on the photoconductive drum 1, as measured in the direction of the auxiliary scanning, and configuring a character to be printed with 20 by 20 dots, then the size of one character is approximately 2.54 mm (height) by 1.69 mm (width).

By way of example, a print format is chosen in such a manner that a page of the fan-folded form 10 in the embodiment (a page is defined by the area extending between adjacent perforations) is printed with 62 lines by 96 characters. The two uppermost lines and the two lowermost lines are, however, used for margins because of 1/6 inch per line.

Hence, the number of X addresses in the page memory M will be 1920 (96 character by 20 dots) and the number of Y addresses will be 1240 (62 lines by 20 dots). What is required for the read control 51 is to specify X and Y addresses, timely reading the information on a single main scanning basis, so as to maintain the relationship between the rules and the resultant printing on the fan-folded form 10.

Therefore, the read control 51 is arranged as follows:

X address is specified by a counter 51X having a clock input coupled to the master clock video signal frequency and a reset input coupled to Hsync. Thus, a counter 51X outputs 1920 addresses during the period of the horizontal synchronization.

A Y address is specified by a combination of two counters, 51y and 51Y and an AND gate 51G.

The counter 51y, has a clock input coupled to Hsync and a reset input coupled to an output signal S1 from AND gate 51G. The counter 51y has an additional output to provide a signal (referred to as 57S hereinafter) each time 57 counts of clock pulses Hsync have been reached.

The counter 51Y has a clock input coupled to signal S1 from AND gate 51G, and a reset input coupled to a page signal produced from PFS.

AND gate 51G performs a logic AND of PFS and 57S from the counter 51y, and supplies an output signal S1 to the clock input of the counter 51Y and the reset input of the counter 51y.

The outputs of the two counters 51y and 51Y specify Y addresses of the page memory M totaling number of 1240.

The read control 51 arranged as stated assures that the information in the page memory M is timely read out to maintain the relationship between the printing and the rules on the fan-folded form 10.

The operation of the read control 51 will now be described by referring to timing charts for the signals PFS, Hsync, 57S and S1.

Figure 4:
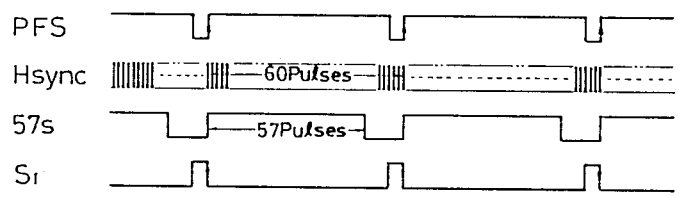
FIGS. 4 through 7 are time charts of the signals in FIG. 3 in different situations.

FIG. 4, is a time chart illustrating a situation in which all signals occur at normal times. In this case, PFS, the signal from the rotary encoder 13, has a pulse repetition rate of one pulse per ½ inch movement of the fan-folded form 10. There should be 60 pulses of Hsync during the period of PFS. This is because 4 rules are marked per 2 pitches (1 inch) of the sprocket holes thereby 10A of the fan-folded form 10, dividing the 1 inch area into three equal parts, with 2 lines printed between adjacent rules. So, 6 lines are printed per 2 pitches (1 inch) of the holes 10A, rendering 3 lines to be printed per 1 pitch (½ inch) of the holes 10A. Since the size of one character is 20×20 dots, the number of dots per 3 lines is 60, which matches the number of pulses of Hsync. The counter 51y specifies Y addresses for the above 3 lines.

In the dot matrix of printing characters, a 16 by 16 dot area is allocated where a characters is actually printed, and the remaining area are allocated as space. Thus, 56 dots (20+20+16) completes the 3 line printing. Therefore, signal 57S (56 dots plus 1 dot) is utilized to indicate when Y addressing for the 3 lines covering the characters is completed.

Since AND gate 51G performs a logical AND of 57S and PFS, the output signal S1 is inhibited until at least the 57 dot printing has been completed. Thereafter, the signal S1 is enabled to initialize the counter 51Y so as to specify the Y address corresponding to the beginning of the next three lines. In this manner, the counter Y continues the process in which it specifies the start on base Y address for each of 3 line segments upon receiving signal S1 occuring at intervals of 3 lines, and is reset upon receiving the page signal in preparation for printing of the next page.

Figure 5:
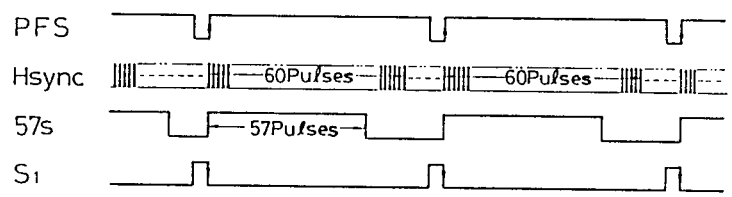

FIG. 5 shows a situation in which the fan-folded form 10 is expanded.

In this case, the interval of pulses of PFS is lengthened, depending on the expansion of the fan-folded form 10. Therefore, the counter 51y is allowed to scan Y addresses covering 3 lines. Since the addressing of the start Y address of the next 3 lines is deferred until the next PFS is supplied, the start position of the next 3 lines is corrected, though the spacing between lines is enlarged when going from the last line of 3 lines to the first line of the next 3 lines. The clock signal S1 is supplied timely to the counter 51Y to assure that this occurs.

Figure 6:
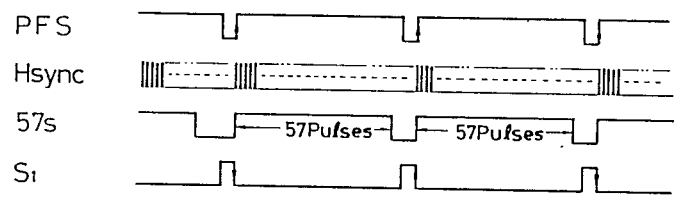

FIG. 6 shows a situation in which the fan-folded form 10 is contracted, but in which the space for 3 line printing is still allowed to cover 57 dots to be printed.

Although the pulse interval of PFS is shortened depending upon the contraction of the fan-folded form 10, there is sufficient space in this case for the printing of 57 dots or character information. Thus, the counter 51y is forcibly reset by the signal S1 from AND gate 51G to specify the Y address for the next 3 lines. At the same time, the signal S1 directs counter 51Y to point to the start address of the next 3 lines. In this manner, the correction is made in the printing position, though the spacing between the lines is narrowed when going from a 3 line segment to the next segment.

Figure 7:
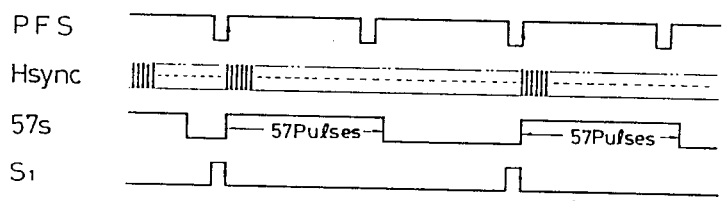

FIG. 7 shows a situation in which the fan-folded form 10 is further contracted so that the space for the 3 line printing cannot cover 57 dots.

Since the signal S1 from AND gate 51G is inhibited until the signal 57S is supplied, it will be enabled upon the next PFS to increment the counter 51Y, which, in turn, specifies the start Y address of the next 3 lines. Therefore, the printing information is printed beyond current segment for the 3 line printing. The next 3 line printing starts in synchronism with the next PFS, disregarding one PFS. Hence, the 3 line printing does not occur at the segment which was in the reach of the previous 3 line printing. This control is used to preserve the print information and to correct the printing position.

In practice, it will be unnecessary to consider the situation in FIG. 7, because the fan-folded form 10 does not contract so much due to the properties of fan-folded forms, although it can expand considerably.

In this manner, the justification system is capable of correction for positional errors in printing due to expansion or contraction of the fan-folded form 10.

Even if the feed rate of the continuous form is maintained at a constant speed, positional printing errors can occur, arising from variations in rpm of the motors for scanning the photoconductive drum 1 and the exposure system due to fluctuations in supply voltage, aging, etc. In such cases, PFS is constant but Hsync is subject to variations. The justification system similarly operates to correct printing errors because the system may be regarded as providing relative control between PFS and Hsync.

Regardless of the above-described features, photo detectors or micro-switches may be used to detect the passage of the end of each segment of the continuous stationery.

What is claimed is:

1. A justification system for use in an electrophotographic printer in which the surface of a photoconductive drum is main-scanned in a direction of the axis of the drum and in which electrophotographic printing occurs on a continuous form which is fed at a predetermined rate by a feed mechanism, said form being provided with a plurality of print segments, said justification system comprising:
   detector means for detecting passage of an end of each segment of said continuous form;
   counter means for counting the number of main scannings on said photoconductive drum, starting with the passage of said end of each said segment;
   storage means for storing printing information; and
   control means for controlling the reading of printing information from said storage means on the basis of said number of said main scannings as counted by said counter means and passage of the end of each said segment as detected by said detector means in such a manner that printing on said continuous form always occurs at a preselected position with respect to each said segment.

2. The system according to claim 1, wherein said control means is operable to initiate reading of the printing information synchronously with the passage of each said segment.

3. The system according to claim 1, wherein said control means is operable, when the output of said counter means indicates that printing has been completed with respect to a segment before the passage of the leading end of the next segment is detected by said detector means, to initiate reading of the print information for each said next segment upon the detection of the passage of the leading end of each said next segment.

4. The system according to claim 1, wherein said detector means comprises a rotary encoder coupled to a tension mechanism for subjecting said continuous form to tension, said tension mechanism being driven in accordance with the movement of said continuous form.

5. The system according to claim 1, wherein said segments correspond to the pitch of sprocket holes formed along opposite sides of said continuous form.

* * * * *

UNITED STATES PATENT AND TRADEMARK OFFICE
CERTIFICATE OF CORRECTION

PATENT NO. : 4,870,434

DATED : Sept. 26, 1989

INVENTOR(S) : Kiyoshi NEGISHI, et al

It is certified that error appears in the above-identified patent and that said Letters Patent is hereby corrected as shown below:

At column 1, lines 31 and 32, change "which is form" to ---form which is---.

At column 2, line 57, insert ---,--- after "drum 1" (second occurrence).

At column 3, line 5, change "and" to ---an--- before "F".

At column 3, line 5, insert ---,--- after "55". At column 3, line 29, change "81A and 81B" to ---81B and 81A---.

At column 3, line 33, change "81A and 81B" to ---81B and 81A---.

At column 3, lines 40 and 41, change "having carried" to ---, carrying---.

At column 3, line 53, change "concidence" to ---coincidence---.

At column 3, line 57, insert ---,--- after "course".

At column 3, line 67, change "comprise" to ---comprises---.

At column 4, line 47, delete [,] after "direction".

At column 4, line 48, insert ---which--- before "prevents".

At column 4, line 49, change "directio,n" to ---direction,---.

At column 4, line 59, change "i.e." to ---i.e.,---.

At column 5, line 6, change "61" to ---51---.

At column 5, line 60, delete [number of].

UNITED STATES PATENT AND TRADEMARK OFFICE
CERTIFICATE OF CORRECTION

PATENT NO. : 4,870,434

DATED : Sept. 26, 1989

INVENTOR(S) : Kiyoshi NEGISHI, et al.

It is certified that error appears in the above-identified patent and that said Letters Patent is hereby corrected as shown below:

At column 6, line 7, change "thereby 10A" to ---10A thereby---.
At column 6, line 17, change "is" to ---are--- before "actually".
At column 6, line 17, delete [a].
At column 6, line 18, change "are" to ---is---.
At column 6, line 53, change "or" to ---of---. At column 6, line 68, delete [the] before "printing".
At column 7, line 1, insert ---the--- before "current".
At column 7, line 1, delete [the] after "for".

Signed and Sealed this

Twenty-second Day of October, 1991

*Attest:*

HARRY F. MANBECK, JR.

*Attesting Officer*  *Commissioner of Patents and Trademarks*